US012524585B2

(12) United States Patent
Hermez et al.

(10) Patent No.: US 12,524,585 B2
(45) Date of Patent: Jan. 13, 2026

(54) UPDATED ENERGY CONSUMPTION PREDICTION BASED ON REAL WORLD DRIVING DATA

(71) Applicant: Rivian IP Holdings, LLC, Plymouth, MI (US)

(72) Inventors: Martin Hermez, West Bloomfield, MI (US); Vignesh Eswar, Santa Ana, CA (US)

(73) Assignee: Rivian IP Holdings, LLC, Irvine, CA (US)

( * ) Notice: Subject to any disclaimer, the term of this patent is extended or adjusted under 35 U.S.C. 154(b) by 995 days.

(21) Appl. No.: 17/386,685

(22) Filed: Jul. 28, 2021

(65) Prior Publication Data

US 2023/0035353 A1 Feb. 2, 2023

(51) Int. Cl.
*G06F 30/20* (2020.01)
*B60R 16/023* (2006.01)
*G07C 5/00* (2006.01)

(52) U.S. Cl.
CPC .......... *G06F 30/20* (2020.01); *B60R 16/0231* (2013.01); *G07C 5/008* (2013.01)

(58) Field of Classification Search
CPC .......... G06F 30/20; G06F 30/25; G06F 30/27; G06F 30/28; G06F 2111/00–2119/22; B60R 16/0231; G07C 5/008; G07C 5/004
See application file for complete search history.

(56) References Cited

U.S. PATENT DOCUMENTS

| | | | | |
|---|---|---|---|---|
| 2012/0179319 A1* | 7/2012 | Gilman | ............. | B60W 50/0097 340/455 |
| 2014/0207363 A1* | 7/2014 | Kanno | ............... | G01C 21/3469 701/123 |
| 2016/0061611 A1* | 3/2016 | Meyer | ................ | G01C 21/3469 701/1 |
| 2016/0061616 A1* | 3/2016 | Meyer | ................ | G01C 21/3469 701/123 |
| 2017/0129361 A1* | 5/2017 | Scaringe | ................... | H02J 7/14 |
| 2019/0049260 A1* | 2/2019 | Gaither | ................ | B60W 40/00 |
| 2020/0164763 A1* | 5/2020 | Holme | .................... | B60L 58/16 |
| 2021/0057920 A1* | 2/2021 | Husain | ...................... | H02J 7/24 |
| 2021/0146785 A1* | 5/2021 | Wang | ..................... | G06N 20/00 |
| 2022/0258743 A1* | 8/2022 | Lee | ......................... | G07C 5/004 |

OTHER PUBLICATIONS

Chen et al. "A Review and Outlook of Energy Consumption Estimation Models for Electric Vehicles" (Year: 2021).*

\* cited by examiner

*Primary Examiner* — Rehana Perveen
*Assistant Examiner* — Troy A Maust
(74) *Attorney, Agent, or Firm* — Foley & Lardner LLP

(57) ABSTRACT

Disclosed embodiments include systems, vehicles, and computer-implemented methods for adjusting a predictive energy consumption model for a vehicle based on actual energy consumption data collected for the vehicle. In an illustrative embodiment, a system includes a computing device including a processor and computer-readable media configured to store computer-executable instructions configured to cause the processor to: collect actual energy consumption data for a vehicle; generate an adjusted energy consumption model for the vehicle by adjusting a predictive energy consumption model responsive to the actual energy consumption data for the vehicle; and estimate a travel range of the vehicle based on available energy for the vehicle according to the adjusted energy consumption model.

17 Claims, 12 Drawing Sheets

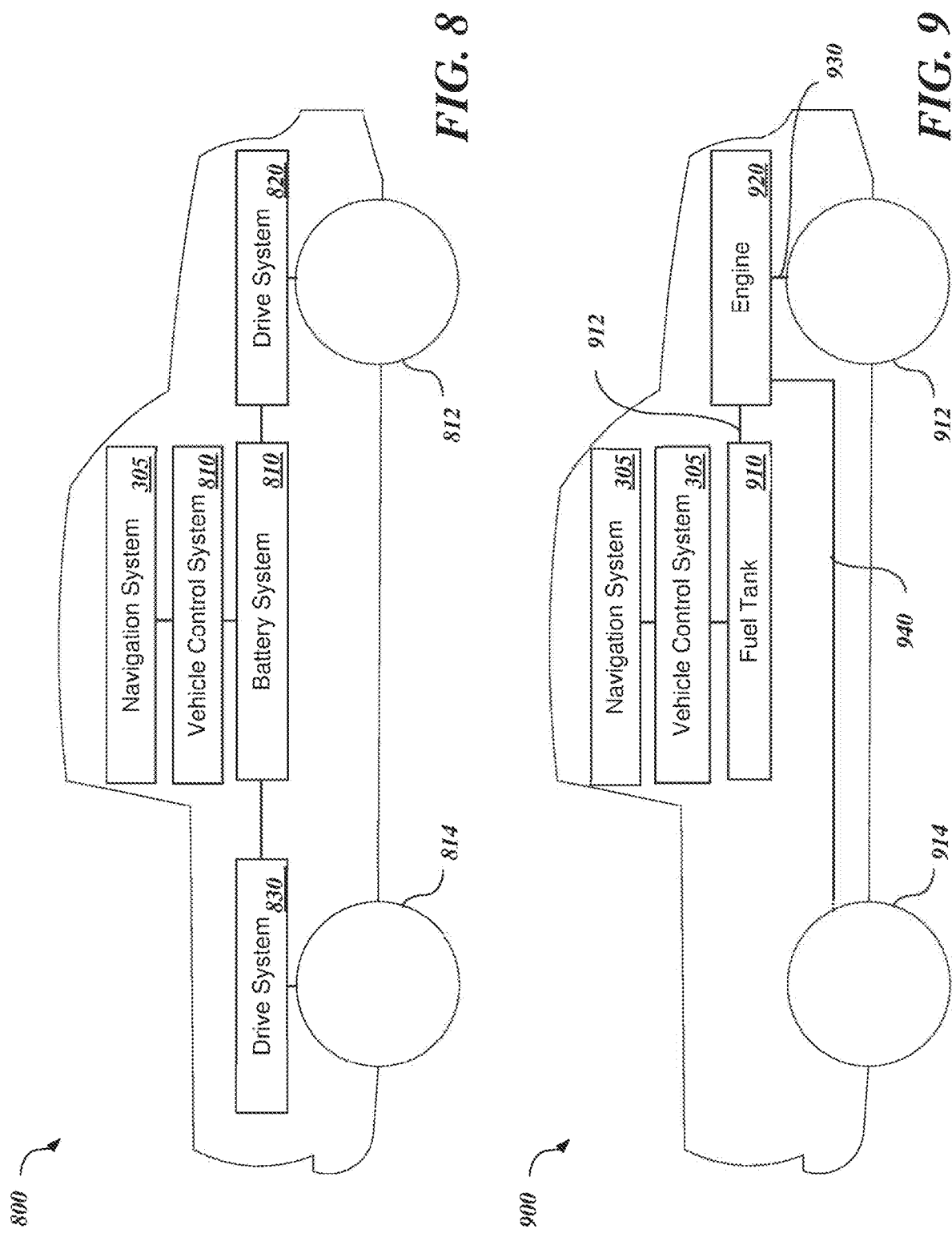

UPDATED ENERGY CONSUMPTION PREDICTION BASED ON REAL WORLD DRIVING DATA

INTRODUCTION

Many vehicles include navigation systems that predict a travel range of the vehicle based on energy stored aboard the vehicle. The prediction is made based on a projected mileage rating from which the travel range may be predicted based on the energy stored aboard the vehicle. However, if the actual mileage rating of the vehicle is not the same as the projected mileage rating, the vehicle may fall short of the predicted travel range.

SUMMARY

Disclosed embodiments include systems, vehicles, and computer-implemented methods for adjusting a predictive energy consumption model for a vehicle based on actual energy consumption data collected for the vehicle.

In an illustrative embodiment, a system includes a computing device including a processor and computer-readable media configured to store computer-executable instructions configured to cause the processor to: collect actual energy consumption data for a vehicle; generate an adjusted energy consumption model for the vehicle by adjusting a predictive energy consumption model responsive to the actual energy consumption data for the vehicle; and estimate a travel range of the vehicle based on an available energy for the vehicle according to the adjusted energy consumption model.

In another illustrative embodiment, a vehicle includes a cabin, a drive system, and a computing device including a processor and computer-readable media configured to store computer-executable instructions configured to cause the processor to: collect actual energy consumption data for a vehicle; generate an adjusted energy consumption model for the vehicle by adjusting a predictive energy consumption model responsive to the actual energy consumption data for the vehicle; and estimate a travel range of the vehicle based on an available energy for the vehicle according to the adjusted energy consumption model.

In another illustrative embodiment, a computer implemented method includes: collecting actual energy consumption data for a vehicle; generating an adjusted energy consumption model for the vehicle by adjusting a predictive energy consumption model responsive to the actual energy consumption data for the vehicle; and estimating a travel range of the vehicle based on an available energy for the vehicle according to the adjusted energy consumption model.

Further features, advantages, and areas of applicability will become apparent from the description provided herein. It will be appreciated that the description and specific examples are intended for purposes of illustration only and are not intended to limit the scope of the present disclosure.

DRAWINGS

The drawings described herein are for illustration purposes only and are not intended to limit the scope of the present disclosure in any way. The components in the figures are not necessarily to scale, with emphasis instead being placed upon illustrating the principles of the disclosed embodiments. In the drawings:

FIGS. 8 and 9 are block diagrams in partial schematic form of an electrically-powered vehicle and an internal combustion engine-powered vehicle, respectively, that may be equipped with the system of FIGS. 1, 3, and 4;

DETAILED DESCRIPTION

The following description explains, by way of illustration only and not of limitation, various embodiments.

By way of a non-limiting introduction and overview, in various embodiments, a system includes a computing device including a processor and computer-readable media configured to store computer-executable instructions configured to cause the processor to: collect actual energy consumption data for a vehicle; generate an adjusted energy consumption model for the vehicle by adjusting a predictive energy consumption model responsive to the actual energy consumption data for the vehicle; and estimate a travel range of the vehicle based on available energy for the vehicle according to the adjusted energy consumption model. It will be appreciated that, by adjusting the predictive energy consumption model based on actual energy consumption data collected for a vehicle and/or operator, various embodiments can use the resulting adjusted energy consumption model to help contribute to more accurately predicting the travel range than currently-known methods. In various embodiments, if desired actual energy consumption data may be used to adjust one or more models that are available over a network for use by operators of other vehicles that may have similar attributes that may similarly affect their energy consumption.

Now that a general overview has been given, details of various embodiments will be explained by way of non-limiting examples given by way of illustration only and not of limitation.

Figure 1:
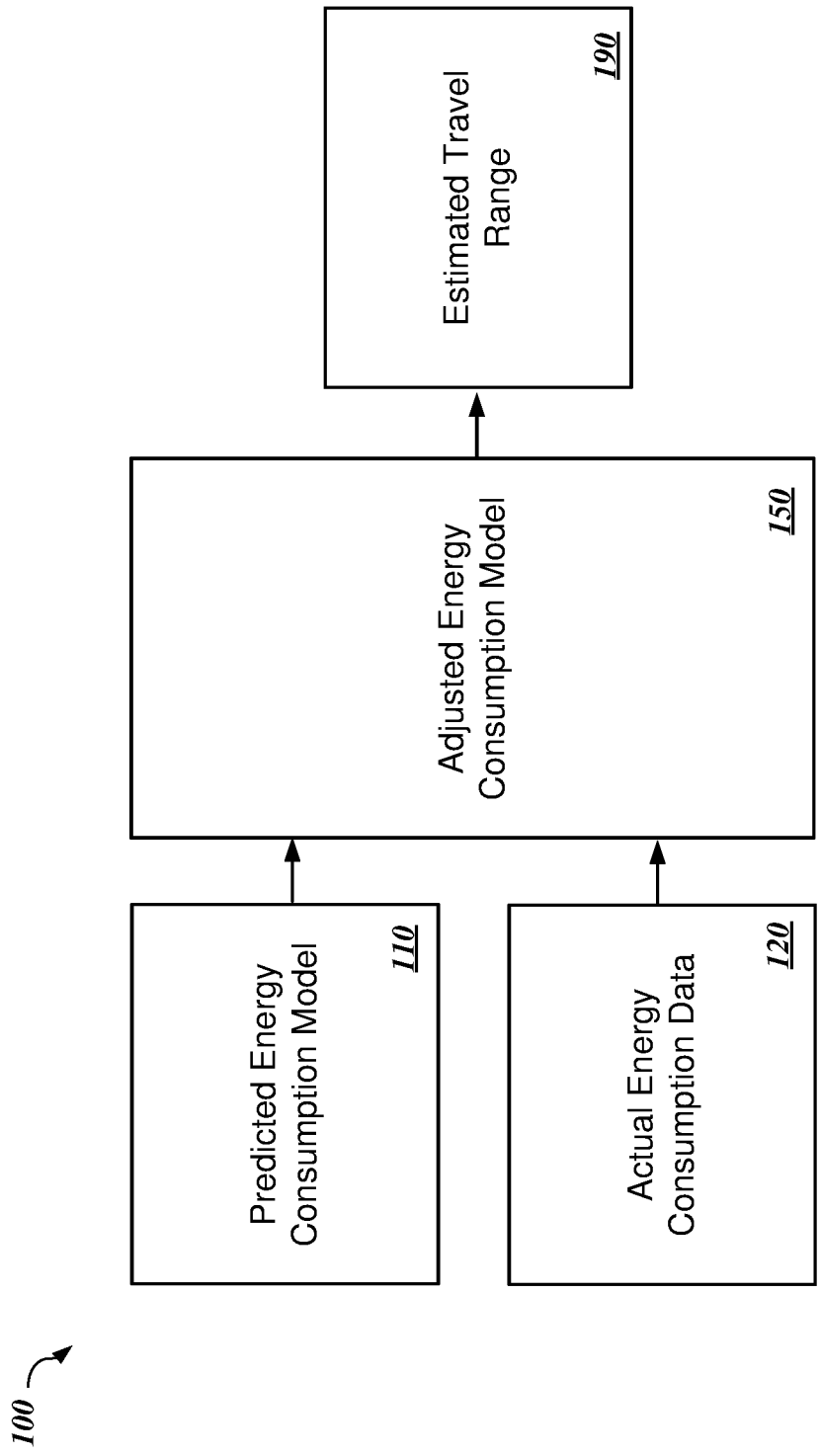
FIG. 1 is a block diagram of a system for adjusting a predicted energy consumption model using actual energy consumption data.

Referring to FIG. 1, an illustrative system 100 includes an adjusted energy consumption model 150 for a vehicle (not shown in FIG. 1). The adjusted energy consumption model 150 is derived from a predicted energy consumption model 110 and is adjusted according to actual energy consumption data 120 that is collected from one or more vehicles in actual use. The adjusted energy consumption model 150 may be used to determine an estimated travel range 190 of the vehicle based on available energy and other factors as further described below.

In various embodiments, the actual energy consumption data 120 may reflect, for example, how much battery power is used by an electric vehicle or a hybrid vehicle to travel a unit distance or how much fuel is used by an internal combustion engine-powered vehicle or a hybrid vehicle to travel a unit distance, or how much battery power and fuel is used by a hybrid vehicle to travel a unit distance. These energy usage rates may be compared to the predicted energy consumption model 110, and, for example, a determination may be made as to what percentage the vehicle is less efficient than the predicted energy consumption model 110 indicates. These percentages may be applied to the predicted energy consumption model 1110 to determine the adjusted energy consumption model 150. By determining the estimated travel range 190 based on the available energy (e.g., a quantity of electric power or fuel aboard the vehicle) using the adjusted energy consumption model 150 instead of the predicted energy consumption model 110, the estimated travel range 190 may be more accurate for the vehicle.

It will be appreciated that, in various embodiments, using the actual energy consumption data 120 to adjust the predicted energy consumption model 110 can help contribute to correcting for considerations that otherwise may possibly result in the predicted energy consumption model 110 inaccurately predicting the estimated travel range 190. In various embodiments, the actual energy consumption data 120, as described further below, introduces considerations that may affect energy consumption as a result of vehicle equipment changes, vehicle wear, vehicle movement (e.g., autonomous/operator driving behaviors), and other considerations. As a result, determining the estimated travel range 190 based on the adjusted energy consumption model 150 may result in a more accurate travel range prediction than a travel range prediction based only on the predicted energy consumption model 110.

Figure 2:
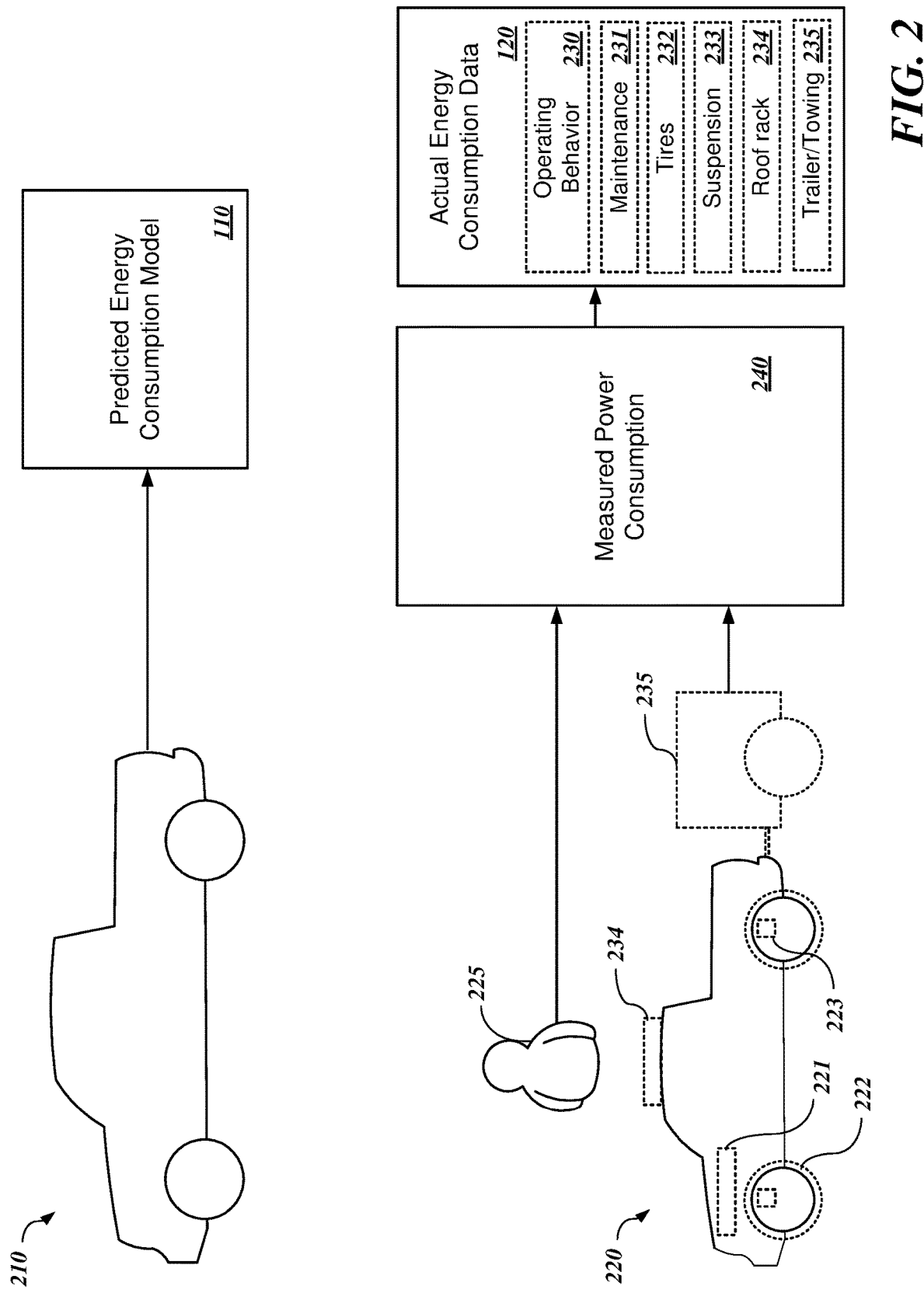
FIG. 2 is a block diagram in partial schematic form depicting differences between a baseline vehicle and a vehicle from which actual energy consumption data is collected.

Referring additionally to FIG. 2, in various embodiments the predicted energy consumption model 110 is based on energy consumption of a baseline, unmodified model of the vehicle 210. In various embodiments, the predicted energy consumption model 110 is based on the baseline vehicle 210 with standard equipment that may be provided with the baseline vehicle 210 when it is sold or otherwise put in use. The predicted energy consumption model 110 may be based on projected data and/or data collected from track or roadway testing of one or more models of the baseline vehicle 210.

By contrast, in various embodiments the actual energy consumption data 120 may be based on measured power consumption 222 of a vehicle 220 used by an operator 225, e.g., autonomous operator, who employs operating behavior that may vary from the behavior used or hypothesized in generating the predicted energy consumption model 110. The operator 225 may employ different behaviors, such as accelerating differently, driving at different speeds, or otherwise behaving differently than operating behaviors assumed or measured in generating the predicted energy consumption model 110. Thus, in various embodiments, the adjusted energy consumption model 150 may account for vehicle movement, stability/instability, steering, and/or autonomous/operator driving behavior, among other possibilities. In various embodiments, different adjusted energy consumption models 150 for the same vehicle 220 may be used for different operators of the vehicle 220.

In various embodiments the actual energy consumption data 120 also may be based on measured power consumption 222 of a vehicle 220 that is in a different condition or configuration than the baseline vehicle 210. Differences between the baseline vehicle 210 and the vehicle 220 may result different measured power consumption 222 than was calculated or otherwise determined for the baseline vehicle 210. In addition, the actual energy consumption data 120 may represent the measured power consumption 222 of the vehicle 220 when the vehicle 220 is used in a towing mode in which the vehicle is towing a trailer or another body.

It will be appreciated that the vehicle 220 may be older or otherwise in a different maintenance condition 221 (represented by a dotted line box under the hood of the vehicle 220) than the baseline vehicle 210. It will also be appreciated that the predicted energy consumption model 110 may be based on the vehicle being in new condition and/or in good maintenance condition. It will be appreciated that a new vehicle may have greater efficiency that an older or poorly maintained vehicle. By contrast, the vehicle 220 may operate less efficiently as a result of age or wear, which could reduce travel range for a given quantity of available energy.

It will be appreciated that the vehicle 220 also may include modifications that may affect vehicle efficiency. For example, the vehicle 220 may have tires 222 that differ from those included on the baseline vehicle 210. It will be appreciated that tires of different types, different sizes, having different tread patterns, or that merely are of different brands may have different rolling resistance coefficients. Thus, the use of the different tires 222 may result in different energy consumption as compared to the tires included in the baseline vehicle 210. Similarly, a suspension component 232 that presents the vehicle 220 at a different height or otherwise changes handling or driving characteristics of the vehicle 220 also may affect energy consumption. It will be appreciated that addition of a roof rack 234 may affect the aerodynamics of the vehicle 220 and/or weight of the vehicle 220 and, thus, may affect energy consumption. In addition, when the vehicle 220 is used in a towing mode, such as in towing a trailer or other object 235 or another body also will affect the energy consumption of the vehicle 220 based on aerodynamics, weight, and similar considerations. Any equipment change also may affect the weight of the vehicle which also will affect energy consumption.

In various embodiments, the actual energy consumption data 120 may be collected from vehicles on the road via a network, as further described below. The actual energy consumption data 120 may be derived from measured power consumption 240, such as by monitoring battery drain in an electric vehicle or a hybrid vehicle or measuring fuel usage in an internal combustion engine-powered vehicle or a hybrid vehicle.

In various embodiments, the actual energy consumption data 120 is associated with attributes 230-235 of the vehicle 220 that may affect the measured power consumption 240. The attributes 230-235 correspond with potential variations from the baseline vehicle 210 and/or the predicted energy consumption model 110 such as, for the sake of illustration and not limitation, operating behavior 230 of the autonomous operator 225, maintenance condition 231, tires 232, suspension 233, use of a roof rack 234, and towing/use of a trailer 235. By associating the attributes with the actual energy consumption data 120, as described further below, multiple adjusted energy consumption models may be generated for use by other vehicles matching some or all of the attributes 230-235 associated with the actual energy consumption data 120.

Figure 3:
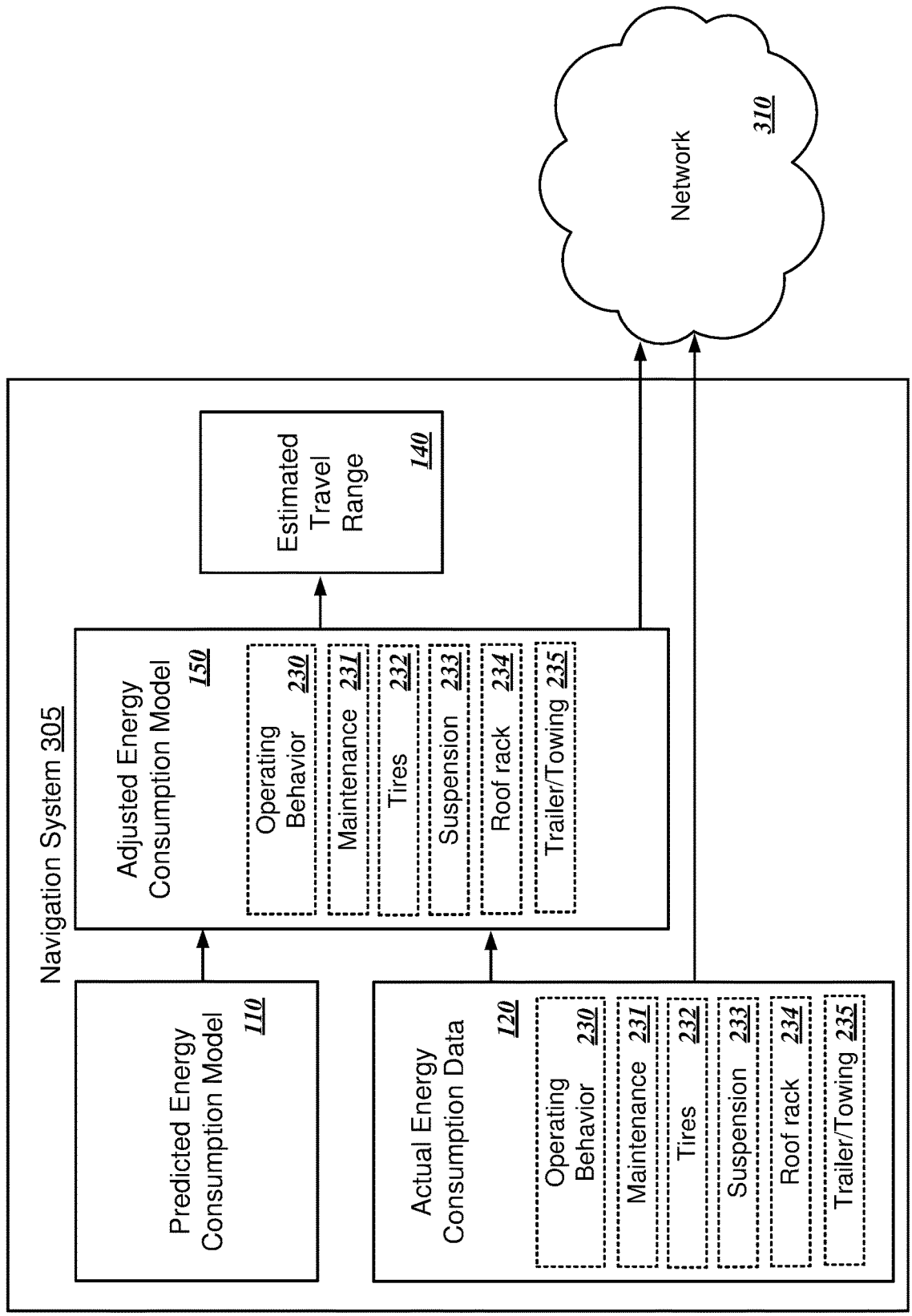
FIGS. 3 and 4 are block diagrams of a system for adjusting a predicted energy consumption model using actual energy consumption data including attributes of a vehicle from which the data is collected.

Referring additionally to FIG. 3, in various embodiments the actual energy consumption data 120 may be collected by a computing system such as a navigation system 305 that is integrated with or transportable aboard the vehicle 220. The actual energy consumption data 120 collected by the navigation system 305 may be applied to a version of the predicted energy consumption model 110 stored in the navigation system 305. The predicted energy consumption model 110 may be adjusted according to the actual energy consumption data 120 in the navigation system 305 to generate the adjusted energy consumption model 150 aboard the vehicle 220. The estimated travel range 190 also may be calculated by the navigation system 305. The actual energy consumption data 120 and/or the adjusted consumption model 150 may be transmitted to a network 310 for use in compiling an actual energy consumption data for the vehicle 220 or for a multitude of similarly-configured vehicles.

In various embodiments, the attributes 230-235 associated with the vehicle 220 are maintained with the actual energy consumption data 120 and/or the adjusted energy consumption model 150 to aid in modifying the adjusted energy consumption model 150 as other changes to the vehicle 220 are made. Maintaining the attributes 230-235 with the actual energy consumption data 120 and/or the adjusted energy consumption model 150 also may be used to help identify an adjusted energy consumption model 150 on the network 310 for a vehicle that shares attributes with the vehicle 220 from which the actual energy consumption data 120 was collected, as described further below.

Figure 4:
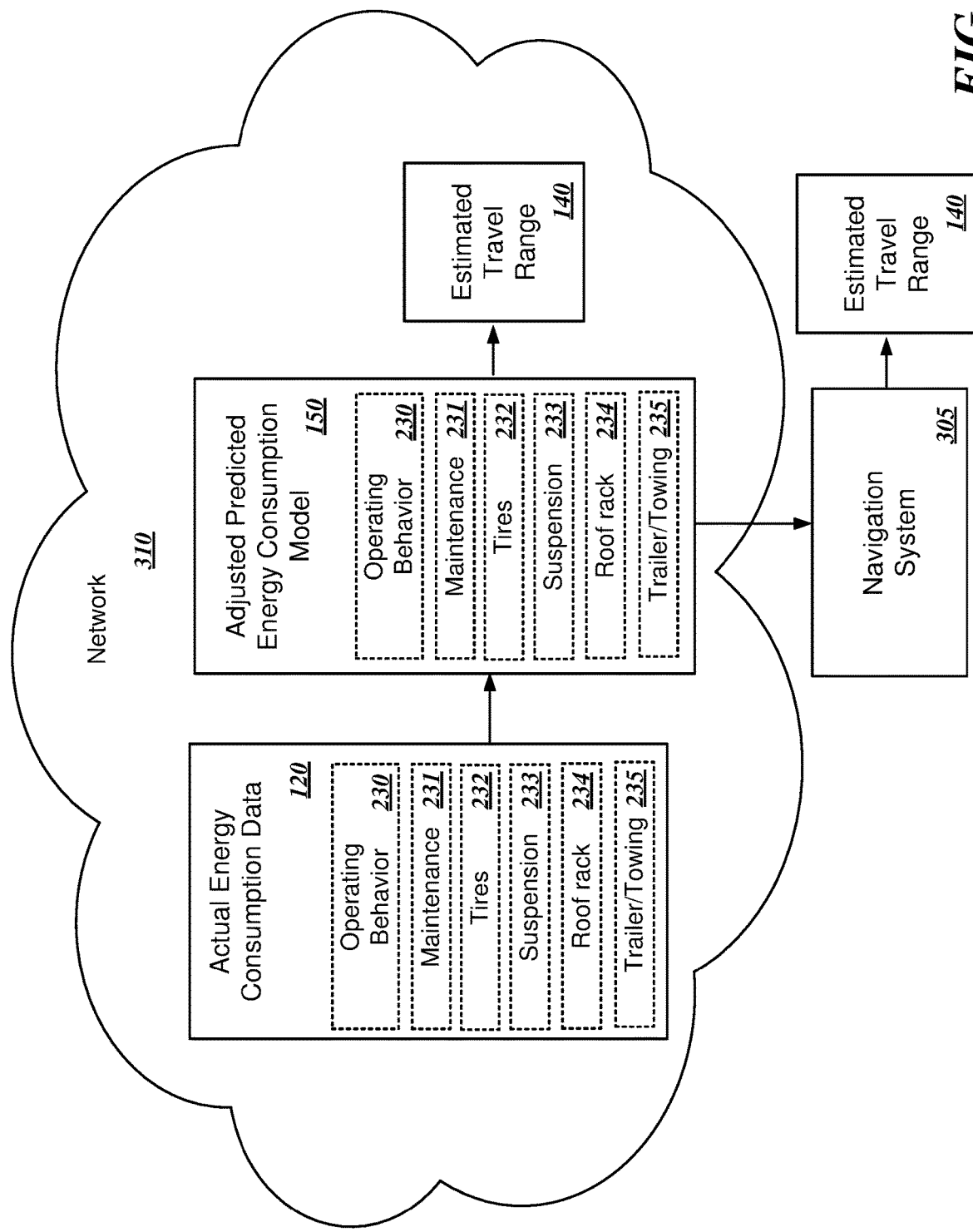

Referring additionally to FIG. 4, in various embodiments the actual energy consumption data 120 is transmitted via a network to a remote system where the predicted energy consumption model 110 is adjusted to generate the adjusted energy consumption model 150. The adjusted energy consumption model 150 may be downloaded to the navigation system 305 aboard the vehicle 220 to determine the estimated travel range or the adjusted energy consumption model 150 may be accessed from the vehicle 220 via the network 310 to determine the estimated travel range 190.

Figure 5:
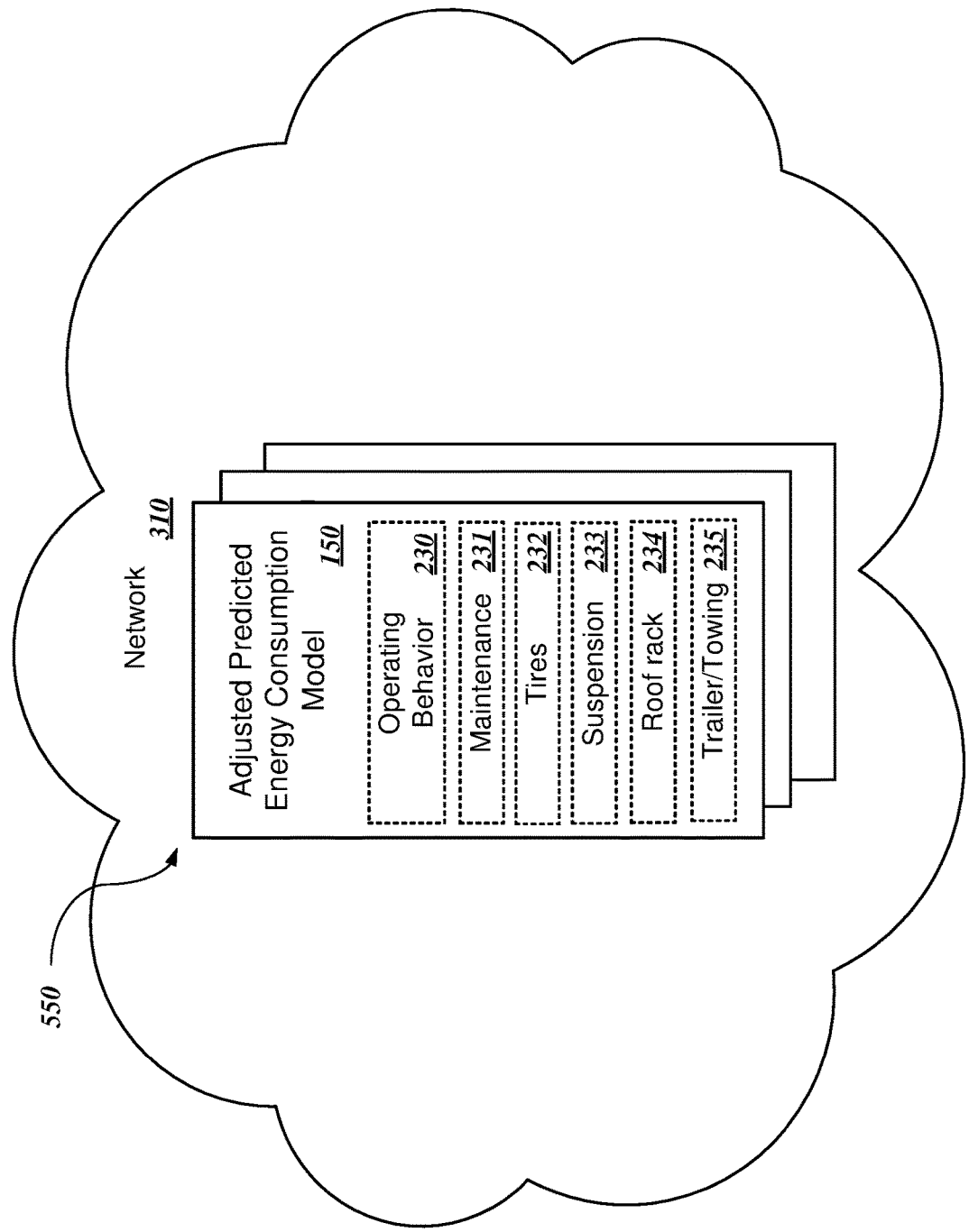
FIG. 5 is a block diagram of a set of adjusted energy consumption models for vehicles having different associated attributes.

Referring additionally to FIG. 5, in various embodiments the network 310 may maintain a set of adjusted energy consumption models 550, such as the energy consumption model 150. In various embodiments, maintaining the attributes 230-235 associated with one or more vehicles from which the actual energy consumption data 120 used to generate the adjusted energy consumption model 150 enables an operator of a vehicle with similar attributes to identify an appropriate adjusted energy consumption model 150 from the set of adjusted energy consumption models 550. Thus, a vehicle with the same or similar attributes to the vehicle 220 may be able to use a previously-derived corresponding adjusted energy consumption model to determine an accurate estimated travel range.

In various embodiments, the set of adjusted energy consumption models 550 may be accessed from and/or downloaded to a computing system integrated with or transportable aboard a vehicle upon identifying attributes to be matched against attributes included the set of adjusted energy consumption models 550. The set of adjusted energy consumption models 550 also may be accessed from another computing system to determine an estimated travel range for a particular route using one or more models from the set of adjusted energy consumption models 550.

Figure 6:
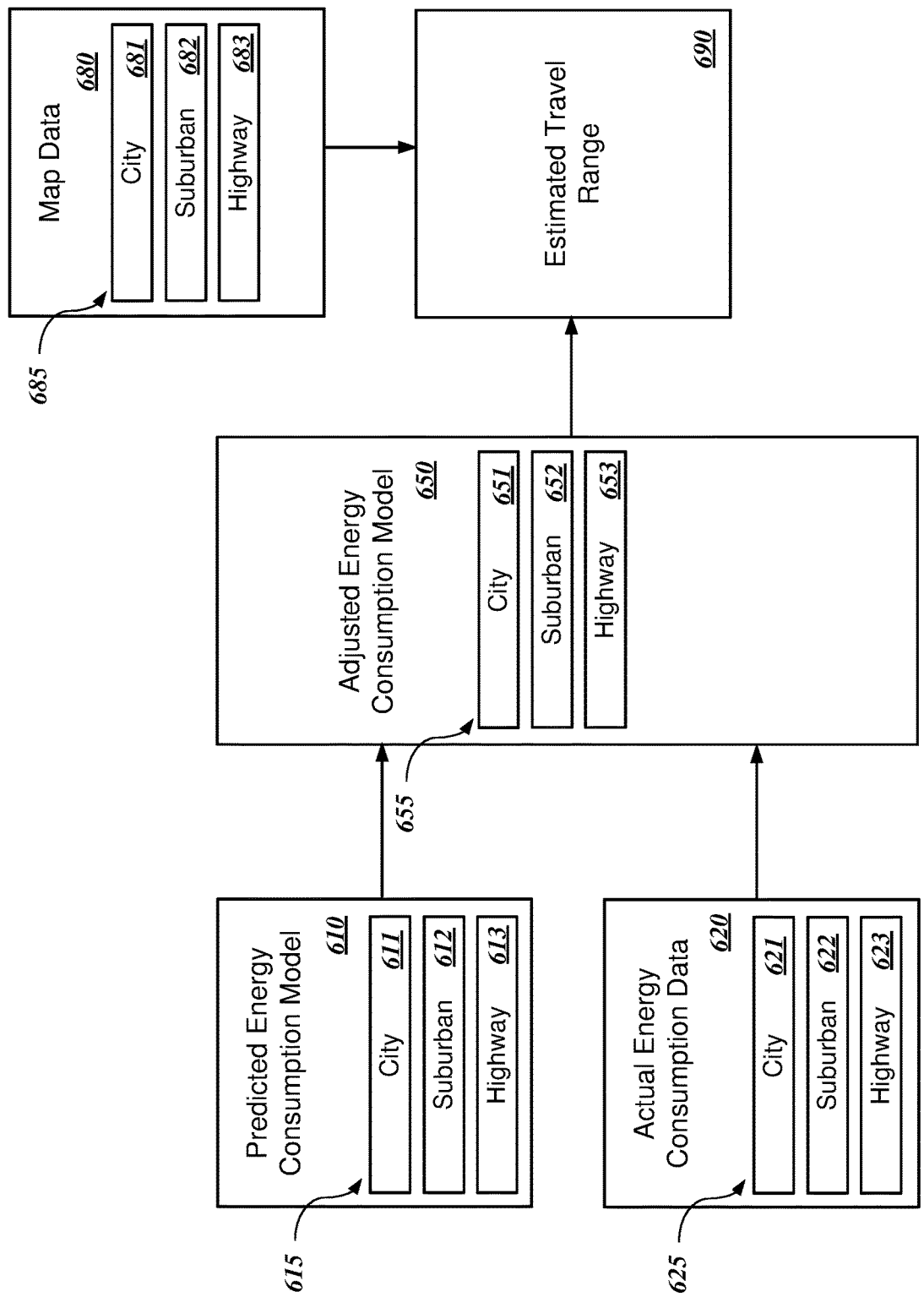
FIG. 6 is a block diagram of a system for adjusting sets of predicted energy consumption models using sets of actual energy consumption data for different driving types.

Referring additionally to FIG. 6, in various embodiments a predicted energy consumption model 610, actual energy consumption data 620, and the adjusted energy consumption model 650 are separately derived and/or maintained according to different driving types. It will be appreciated that different vehicles have different efficiency ratings for city, suburban, and highway driving because of, in part, differences in stopping, starting, cruising speeds, and other factors. Thus, in accurately predicting an estimated travel range 690 for a particular driving type, it may be useful to have model data that is correlated with the each of the different driving types. It will be appreciated that these driving types, e.g., city, suburban, and highway driving, are included by way of illustration and not by way of limitation. Other driving types may include general off-driving, severe terrain driving, driving in rain, snow, or other weather conditions, etc.

In various embodiments, the estimated travel range 690 is determined in part by map data 680 that, for a destination specified by an operator of the vehicle, includes data to identify when the route or routes include city driving 681 with anticipated stop and go driving, suburban driving 682 with a mixture of stop and go driving and highway driving, and highway driving 683. In various embodiments, in order to accurately predict the estimated travel range 690, a predicted energy consumption model 610 includes a set of separate models 615 including city driving 611, suburban driving 612, and highway driving 613, and the adjusted energy consumption model 650 similarly will include a set of separate models 655 for city driving, 651, suburban driving 652, and highway driving 653.

To accurately adjust the predicted energy consumption model 610, the actual energy consumption data 620 includes a set of separate consumption data 625 including energy consumption data for city driving 621, suburban driving 622, and highway driving 623. The set of separate models 615 of the predicted energy consumption model 610 thus may be adjusted with one of the corresponding set of separate actual energy consumption data 620 to generate the set of separate adjusted energy consumption models 655 for city driving, 651, suburban driving 652, and highway driving 653 of the adjusted energy consumption model 650. As a result, when a vehicle destination is identified and the driving type or types 681-683 to be encountered en route to the destination have been identified, the estimated travel range 690 may be determined from the corresponding model from the set of separate models 655 for city driving, 651, suburban driving 652, and highway driving 653 of the adjusted energy consumption model 650.

In various embodiments, each of the sets of separate consumption data 625 in the actual energy consumption data 620 and the set of separate models 655 of the adjusted energy consumption model 650 may still be associated with the attributes of the operator and/or vehicles as described with reference to FIG. 2. As a result, appropriate adjusted energy consumption models may be generated for different driving types and/or for different operator or vehicle attributes.

In various embodiments, the navigation system 305 may be integrated into the vehicle or its functions may be supported by a standalone computing device transportable aboard a vehicle. A vehicle may include a car, truck, sport utility vehicle, van, or recreational vehicle. In various embodiments, the vehicle also may include a motorcycle, all-terrain vehicle, or an electrically-powered moped or bicycle. In various embodiments, the vehicle also may include a marine vessel (such as a boat or a ship). In various embodiments, the vehicle also may include an aircraft (such as fixed-wing aircraft, rotary wing aircraft, and lighter-than-air craft).

Figure 7:
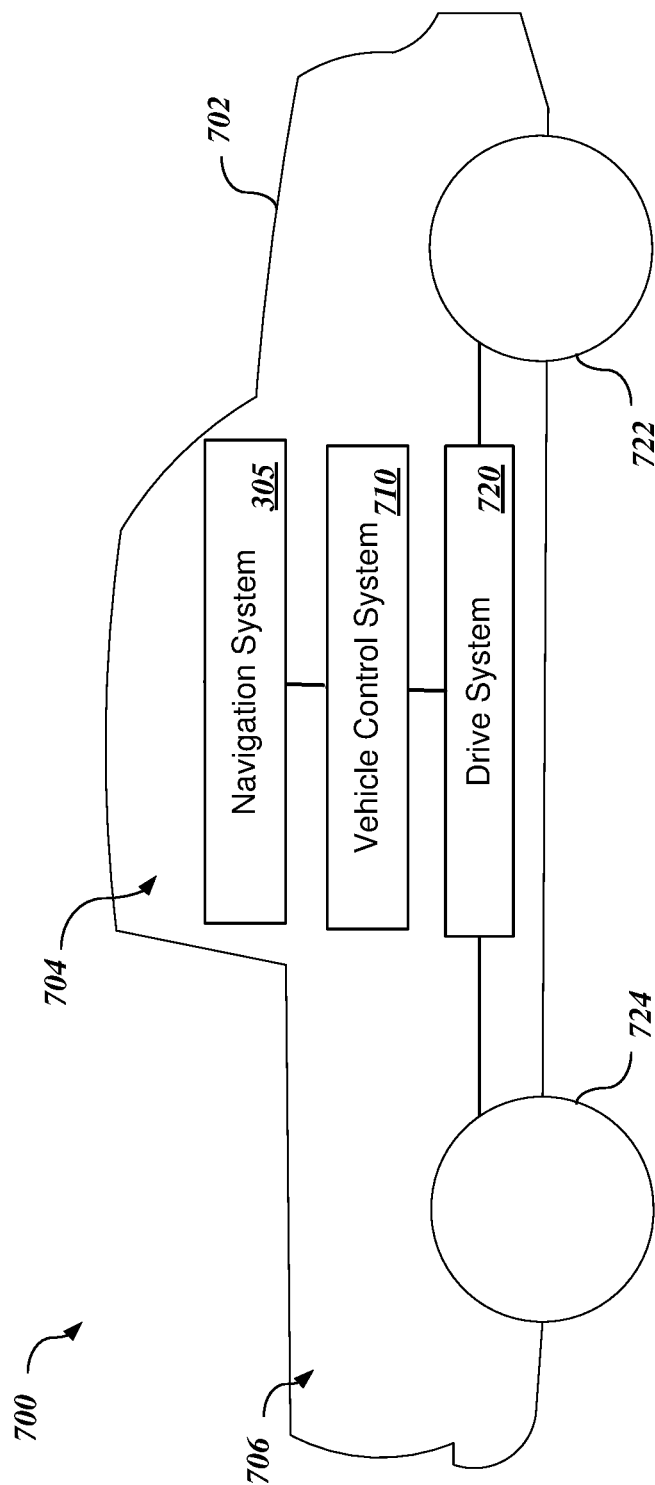
FIG. 7 is a block diagram in partial schematic form of an illustrative vehicle that includes the system of FIGS. 1, 3, and 4.

Referring additionally to FIG. 7, in various embodiments a vehicle 700 includes a vehicle control system 710 that controls operation of the vehicle 700 and with which the navigation system 305 may communicate to collect the actual energy consumption data 120 or 620. In various embodiments, the navigation system 305 may be a stand-alone system that is transportable aboard the vehicle 700 or transportable without a vehicle, such as a navigation system associated with a smartphone, a tablet computer, or other portable computing device.

In various embodiments, the vehicle 700 includes a body 702 that may include a cabin 704 capable of accommodating an operator, one or more passengers, and/or cargo and a cargo area 706 separate from the cabin 706, such as a trunk or a truck bed or the like, that is capable of transporting cargo. When the cabin 704 accommodates one or more occupants, the navigation system 305 may be installed in and/or accessible from the cabin 704, as further described below with reference to FIG. 10. The vehicle 700 includes a drive system 720, as further described below, which is selectively engageable with one or more front wheels 722 and/or one or more rear wheels 724 to motivate, accelerate, decelerate, stop, and steer the vehicle 700.

Referring additionally to FIG. 8, the navigation system 305 may be used with an electrically-powered vehicle 800. The wheels 812 and/or 814 may be motivated by one or more electrically-powered drive systems 820 and/or 830, such as motors, operably coupled with the wheels 812 and/or 814. The drive systems 820 and 830 draw power from a battery system 810, which also may be used to power the navigation system 305.

Referring additionally to FIG. 9, the navigation system 305 may be used with an internal combustion engine-powered vehicle 900. The wheels 912 and/or 914 may be motivated by an internal combustion or hybrid engine 920 coupled with a fuel tank 910 via a fuel line 912. The engine 920 may be coupled to the wheels 912 and/or 914 by mechanical linkages 930 and 940, respectively, including axles, transaxles, or other drive train systems to provide rotational force to power the wheels 912 and/or 914. It will be appreciated that FIGS. 7-9 show four-wheeled land vehicles. However, as previously mentioned, it will be appreciated that the navigation system 305 may be integrated with other land vehicles, aircraft, or marine craft.

Figure 10:
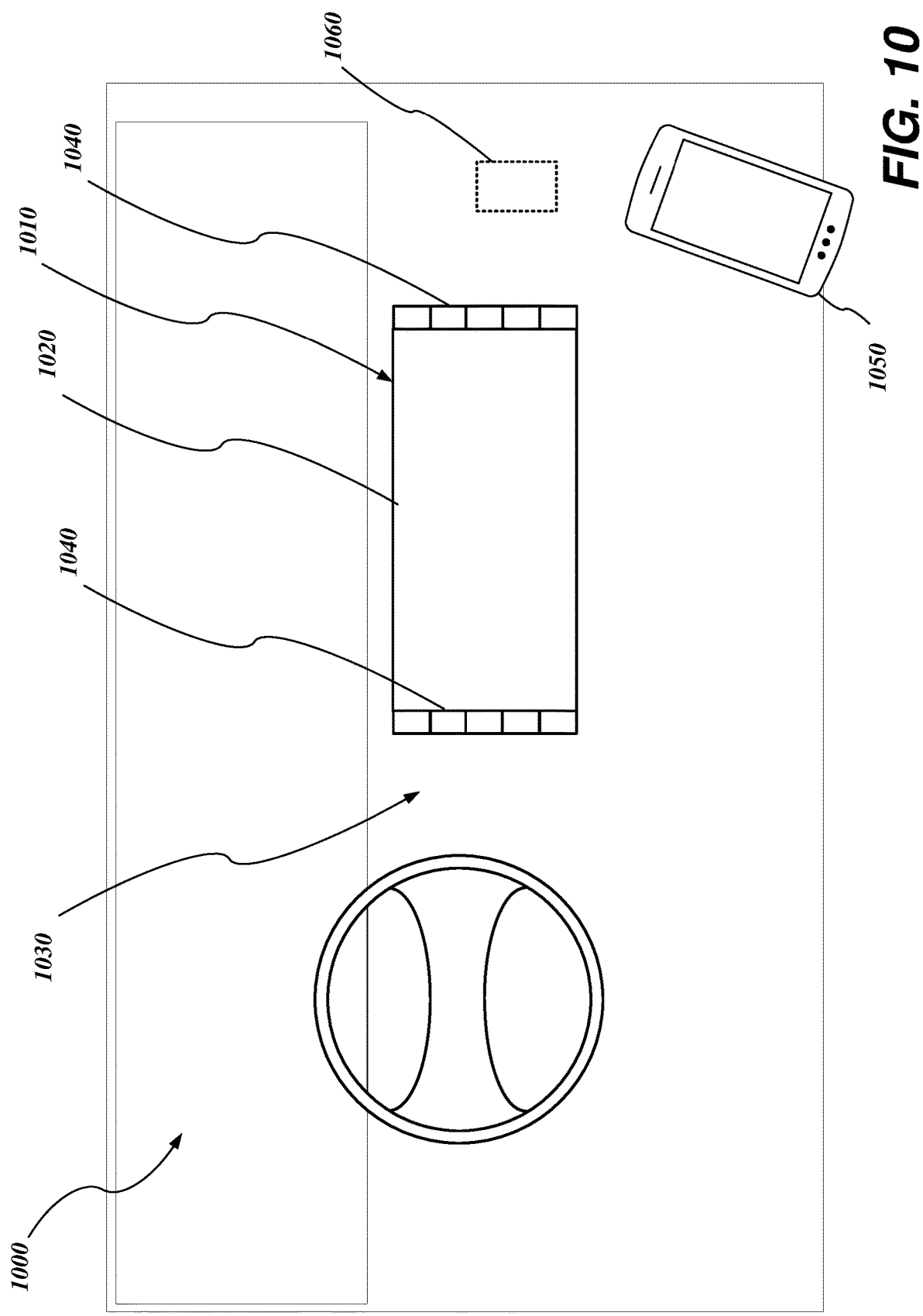
FIG. 10 is a perspective view of a cabin of a vehicle with access to the system of FIGS. 1, 3, and 4.

Referring additionally to FIG. 10, in various embodiments a cabin 1000 (if provided) of a vehicle, such as the cabin 704 of the vehicle 700 (FIG. 7), may include an integrated navigation system 1010 configured to provide the functions described herein. In such embodiments, the integrated navigation system 1010 may use a display 1020 incorporated in a dashboard or console 1030 within the cabin 1000. The display 1010 may include an interactive display or a user may engage the integrated navigation system 1010 with other input devices 1040 arrayed on the dashboard 1030 or via other controls. The navigation system also may be supported on a standalone computing device 1050, such as a smartphone, a tablet computer, a portable computer, a smartwatch, or a dedicated device. The system 1050 may interface with the vehicle control system 710 via a wired or wireless interface 1060 to enable the standalone computing device 1050 to exchange data with the vehicle control system 710 to, for example, collect the actual energy consumption data 120 or 620.

Figure 11:
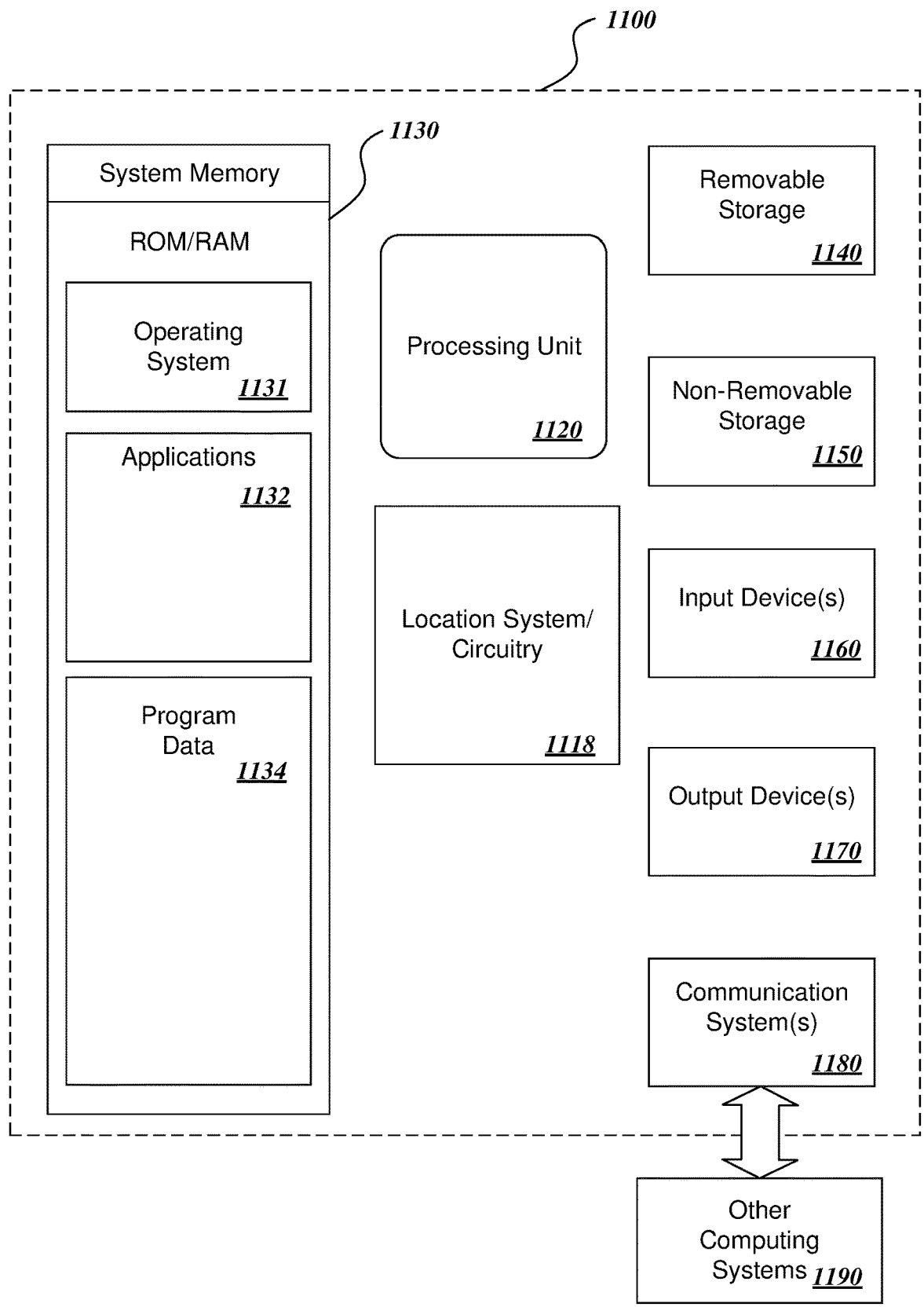
FIG. 11 is a block diagram of an illustrative computing system for performing functions of the system of FIGS. 1, 3, and 4.

Referring additionally to FIG. 11 and given by way of example only and not of limitation, the navigation system 305 may include a general purpose computing device 1100 configured to operate according to computer-executable instructions for determining and visualizing travel range as previously described. The computing device 1100 typically includes at least one processing unit 1120 and a system memory 1130. Depending on the configuration and type of computing device, the system memory 1130 may include volatile memory, such as random-access memory ("RAM"), non-volatile memory, such as read-only memory ("ROM"), flash memory, and the like, or a combination of volatile memory and non-volatile memory. The system memory 1130 typically maintains an operating system 1131, one or more applications 1132, and program data 1134. The operating system 1131 may include any number of operating systems executable on desktop or portable devices including, but not limited to, Linux, Microsoft Windows®, Apple iOS®, or Android®, or a proprietary operating system. The applications 1132 may include instructions to collect the actual energy consumption data 120 or 620, to generate the adjusted energy consumption model 120 or 620, and to determine the estimated travel range 190 or 690. The program data 1134 may include the map data 680, the actual energy consumption data 120 or 620, the predicted energy consumption model 110 or 610, and/or the adjusted energy consumption model 150 or 650.

The computing device 1100 may also have additional features or functionality. For example, the computing device 1100 may also include additional data storage devices (removable and/or non-removable) such as, for example, magnetic disks, optical disks, tape, or flash memory. Such additional storage devices are illustrated in FIG. 11 by removable storage 1140 and non-removable storage 1150. Computer storage media may include volatile and non-volatile, removable and non-removable media implemented in any method or technology for storage of information, such as computer-readable instructions, data structures, program modules or other data. The system memory 1130, the removable storage 1140, and the non-removable storage 1150 are all examples of computer storage media. Available types of computer storage media include, but are not limited to, RAM, ROM, EEPROM, flash memory (in both removable and non-removable forms) or other memory technology, CD-ROM, digital versatile disks (DVD) or other optical storage, magnetic cassettes, magnetic disk storage or other magnetic storage devices, or any other medium which can be used to store the desired information and which can be accessed by the computing device 1100. Any such computer storage media may be part of the computing device 1100.

The computing device 1100 may also have input device(s) 1160 such as a keyboard, stylus, voice input device, touch-screen input device, etc. Output device(s) 1170 such as a display, speakers, short-range transceivers such as a Bluetooth transceiver, etc., may also be included. The computing device 1100 also may include one or more communication systems 1180 that allow the computing device 1100 to communicate with other computing systems 1190, such as those described below with reference to FIG. 12. As previously mentioned, the communication system 1180 may include systems for wired or wireless communications. Available forms of communication media typically carry computer-readable instructions, data structures, program modules or other data in a modulated data signal such as a carrier wave or other transport mechanism and includes any information delivery media. The term "modulated data signal" may include a signal that has one or more of its characteristics set or changed in such a manner as to encode information in the signal. By way of illustrative example only and not of limitation, communications media may include wired media such as a wired network or direct-wired connection, and wireless media such as acoustic, radio frequency (RF), infrared and other wireless media. The term computer-readable media as used herein includes both storage media and communication media.

In further reference to FIG. 11, the computing device 1100 may include the location system/circuitry 1118, which may include global positioning system ("GPS") and/or geolocation circuitry that can automatically discern its location based on relative positions to multiple GPS satellites or other signal sources, such as cellphone towers or other signal sources. The location system/circuitry 1118 may be used to determine a location of the navigation system 305.

Figure 12:
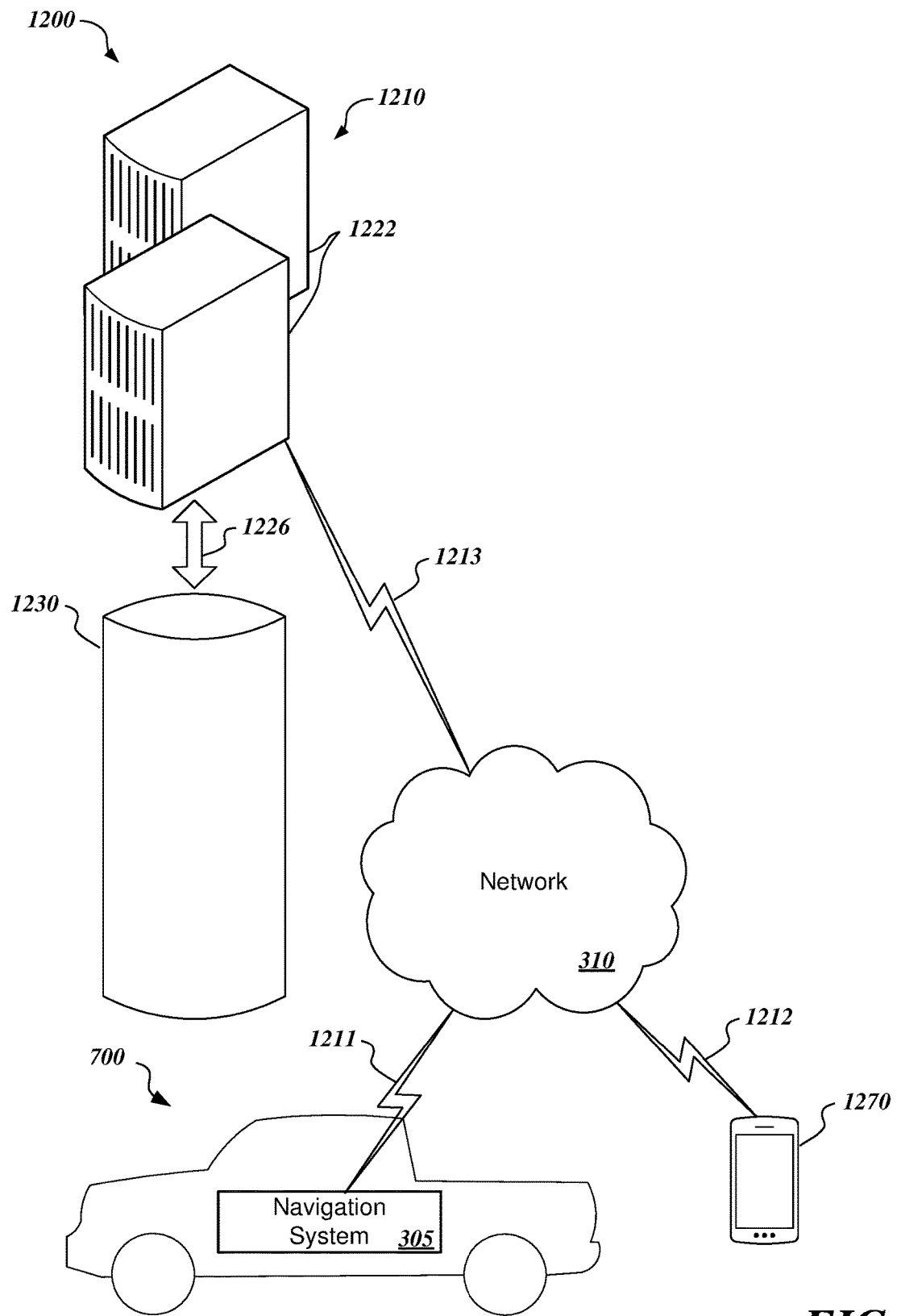
FIG. 12 is a block diagram of one or more illustrative systems of FIGS. 1, 3 and 4 communicating with one or more remote systems.

In addition to one or more onboard computing systems, various embodiments may communicate with remote computing systems to perform the functions herein described. Referring to FIG. 12, an operating environment 1200 may include one or more sets of remote computing systems 1210. It will be appreciated that the remote computing system 1210 may include one or more computing systems 1222 that may reside at one or more locations. In various embodiments, the remote computing systems 1210 each may include a server or server farm. The remote computing system 1210 may be used to generate and store the predicted energy consumption model 110, receive and store the actual energy consumption data 120, and/or generate and store the adjusted energy consumption model 150, as previously described with reference to FIGS. 3-5. Data may be stored in high-speed storage 1230 accessible by the remote computing systems 1210 over a high-speed bus 1226.

In various embodiments, the remote computing systems 1210 communicate with the network 310 over wired and/or wireless communications links 1213. The navigation system 305 may be integrated with or transportable aboard a vehicle, such as the vehicle 700 (FIG. 7). The navigation system 305 may communicate over the network 310 via communications links 1211 to access the remote computing system 1210 to retrieve or store data from the data storage 1230. The communications links 1211 may include wireless communications links to enable mobile communications with the navigation system 305 or may include a wired links to be used, for example, when the vehicle 700 includes an electric vehicle that is stopped and/or plugged in for charging.

The navigation system 305 also may be supported by a computing system 1270 that is not integrated with the vehicle 700. The computing system 1270 may include a portable computing system, such as a portable computer, tablet computer, smartphone, or smartwatch. The computing system 1270 may communicate over the network 310 via a communications link 1212 to access the remote computing system 1210 to retrieve data such as the predicted energy consumption model 110, receive and store the actual energy consumption data 120, and/or generate and store the adjusted energy consumption model 150, as previously described with reference to FIGS. 3-5. The communications link 1212 may include a wireless or a wired communications link.

Figure 13:
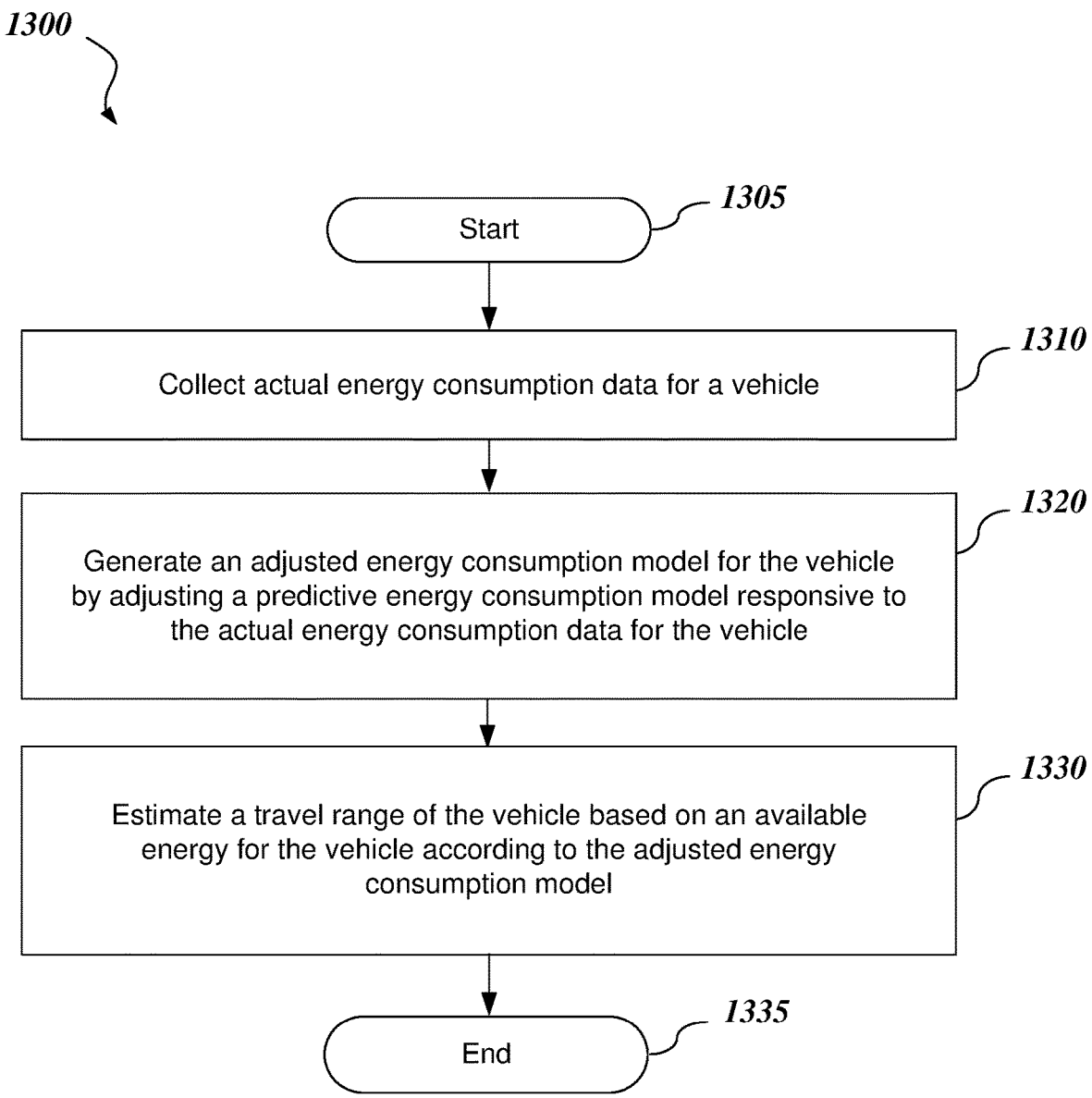
FIG. 13 is a flow chart of an illustrative method for adjusting a predictive energy consumption model for a vehicle based on actual energy consumption data collected for the vehicle.

Referring to FIG. 13, an illustrative method 1300 is provided for adjusting a predictive energy consumption model for a vehicle based on actual energy consumption data collected for the vehicle. The method 1300 starts at a block 1305. At a block 1310, actual energy consumption data is collected for a vehicle. At a block 1320, an adjusted energy consumption model for the vehicle is generated by adjusting a predictive energy consumption model responsive to the actual energy consumption data for the vehicle. At a block 1330, a travel range of the vehicle is estimated based on available energy for the vehicle according to the adjusted energy consumption model. The method 1300 ends at a block 1335.

Those skilled in the art will recognize that at least a portion of the devices and/or processes described herein can be integrated into a data processing system. Those having skill in the art will recognize that a data processing system generally includes one or more of a system unit housing, a video display device, memory such as volatile or non-volatile memory, processors such as microprocessors or digital signal processors, computational entities such as operating systems, drivers, graphical user interfaces, and applications programs, one or more interaction devices (e.g., a touch pad, a touch screen, an antenna, etc.), and/or control systems including feedback loops and control motors (e.g., feedback for sensing position and/or velocity; control motors for moving and/or adjusting components and/or quantities). A data processing system may be implemented utilizing suitable commercially available components, such as those typically found in data computing/communication and/or network computing/communication systems.

The term module, as used in the foregoing/following disclosure, may refer to a collection of one or more components that are arranged in a particular manner, or a collection of one or more general-purpose components that may be configured to operate in a particular manner at one or more particular points in time, and/or also configured to operate in one or more further manners at one or more further times. For example, the same hardware, or same portions of hardware, may be configured/reconfigured in sequential/parallel time(s) as a first type of module (e.g., at a first time), as a second type of module (e.g., at a second time, which may in some instances coincide with, overlap, or follow a first time), and/or as a third type of module (e.g., at a third time which may, in some instances, coincide with, overlap, or follow a first time and/or a second time), etc. Reconfigurable and/or controllable components (e.g., general purpose processors, digital signal processors, field programmable gate arrays, etc.) are capable of being configured as a first module that has a first purpose, then a second module that has a second purpose and then, a third module that has a third purpose, and so on. The transition of a reconfigurable and/or controllable component may occur in as little as a few nanoseconds, or may occur over a period of minutes, hours, or days.

In some such examples, at the time the component is configured to carry out the second purpose, the component may no longer be capable of carrying out that first purpose until it is reconfigured. A component may switch between configurations as different modules in as little as a few nanoseconds. A component may reconfigure on-the-fly, e.g., the reconfiguration of a component from a first module into a second module may occur just as the second module is needed. A component may reconfigure in stages, e.g., portions of a first module that are no longer needed may reconfigure into the second module even before the first module has finished its operation. Such reconfigurations may occur automatically, or may occur through prompting by an external source, whether that source is another component, an instruction, a signal, a condition, an external stimulus, or similar.

For example, a central processing unit of a personal computer may, at various times, operate as a module for displaying graphics on a screen, a module for writing data to a storage medium, a module for receiving user input, and a module for multiplying two large prime numbers, by configuring its logical gates in accordance with its instructions. Such reconfiguration may be invisible to the naked eye, and in some embodiments may include activation, deactivation, and/or re-routing of various portions of the component, e.g., switches, logic gates, inputs, and/or outputs. Thus, in the examples found in the foregoing/following disclosure, if an example includes or recites multiple modules, the example includes the possibility that the same hardware may implement more than one of the recited modules, either contemporaneously or at discrete times or timings. The implementation of multiple modules, whether using more components, fewer components, or the same number of components as the number of modules, is merely an implementation choice and does not generally affect the operation of the modules themselves. Accordingly, it should be understood that any recitation of multiple discrete modules in this disclosure includes implementations of those modules as any number of underlying components, including, but not limited to, a single component that reconfigures itself over time to carry out the functions of multiple modules, and/or multiple components that similarly reconfigure, and/or special purpose reconfigurable components.

In some instances, one or more components may be referred to herein as "configured to," "configured by," "configurable to," "operable/operative to," "adapted/adaptable," "able to," "conformable/conformed to," etc. Those skilled in the art will recognize that such terms (for example "configured to") generally encompass active-state components and/or inactive-state components and/or standby-state components, unless context requires otherwise.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (for example, bodies of the appended claims) are generally intended as "open" terms (for example, the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (for example, "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (for example, the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (for example, "a system having at least one of A, B, and C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software (e.g., a high-level computer program serving as a hardware specification), firmware, or virtually any combination thereof, limited to patentable subject matter under 35 U.S.C. 101. In an embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, limited to patentable subject matter under 35 U.S.C. 101, and that designing the circuitry and/or writing the code for the software (e.g., a high-level computer program serving as a hardware specification) and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link (e.g., transmitter, receiver, transmission logic, reception logic, etc.), etc.).

With respect to the appended claims, those skilled in the art will appreciate that recited operations therein may generally be performed in any order. Also, although various operational flows are presented in a sequence(s), it should be understood that the various operations may be performed in other orders than those which are illustrated or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

While the disclosed subject matter has been described in terms of illustrative embodiments, it will be understood by those skilled in the art that various modifications can be made thereto without departing from the scope of the claimed subject matter as set forth in the claims.

It will be appreciated that the detailed description set forth above is merely illustrative in nature and variations that do not depart from the gist and/or spirit of the claimed subject matter are intended to be within the scope of the claims. Such variations are not to be regarded as a departure from the spirit and scope of the claimed subject matter.

What is claimed is:

1. A system comprising:
   a computing device including:
   a processor; and
   computer-readable media configured to store computer-executable instructions configured to cause the processor to:
   collect actual energy consumption data reflecting a usage rate of an amount of battery power for a vehicle to travel a unit distance;
   determine a difference between the usage rate and a predicted usage rate of a predictive energy consumption model;
   generate an adjusted energy consumption model for the vehicle by adjusting the predictive energy consumption model to account for the difference between the usage rate and the predicted usage rate; and
   estimate a travel range of the vehicle based on an available energy for the vehicle according to the adjusted energy consumption model, wherein the travel range of the vehicle is displayed using a navigation system of the vehicle.

2. The system of claim 1, wherein the predictive energy consumption model includes a set of models for a driving type, and predictive clusters of the predictive energy consumption model are adjusted according to respective actual clusters of the actual energy consumption data.

3. The system of claim 1, wherein the computer-executable instructions are further configured to collect the actual energy consumption data for at least one identified operator of the vehicle, wherein the adjusted energy consumption model is representative of driving of the at least one identified operator.

4. The system of claim 1, wherein the actual energy consumption data is collected for the vehicle and the actual energy consumption data represents at least one of a configuration of the vehicle, a maintenance condition of the vehicle, and a towing mode.

5. The system of claim 1, wherein the computer-executable instructions are further configured to:
   identify at least one vehicle modification not included in a baseline vehicle used in during generation of the adjusted energy consumption model and that is used during collection of the actual energy consumption data;
   associate the at least one vehicle modification with the adjusted energy consumption model; and
   responsive to an indication that the at least one vehicle modification is in use, estimate the travel range using the adjusted energy consumption model associated with the at least one vehicle modification, wherein the at least one vehicle modification includes at least one element chosen from a trailer, a roof rack, a non-baseline wheel type, and a non-baseline tire type, and a non-baseline suspension component.

6. The system of claim 1, wherein the computer-executable instructions are further configured to:
   communicate the actual energy consumption data over a network to a remote computing system; and
   generate a network-based adjusted energy consumption model that is accessible to a plurality of vehicles over the network.

7. A vehicle comprising:
   a cabin;
   a drive system; and
   a computing device including:
   a processor; and
   computer-readable media configured to store computer-executable instructions configured to cause the processor to:
   collect actual energy consumption data reflecting a usage rate of an amount of battery power for the vehicle to travel a unit distance;
   determine a difference between the usage rate and a predicted usage rate of a predictive energy consumption model;
   generate an adjusted energy consumption model for the vehicle by adjusting the predictive energy consumption model to account for the difference between the usage rate and the predicted usage rate; and
   estimate a travel range of the vehicle based on an available energy for the vehicle according to the adjusted energy consumption model, wherein the travel range of the vehicle is displayed using a navigation system of the vehicle.

8. The vehicle of claim 7, wherein the predictive energy consumption model includes a set of models for a driving type, and predictive clusters of the predictive energy consumption model are adjusted according to respective actual clusters of the actual energy consumption data.

9. The vehicle of claim 7, wherein the computer-executable instructions are further configured to collect the actual energy consumption data for at least one identified operator of the vehicle, wherein the adjusted energy consumption model is representative of driving of the at least one identified operator.

10. The vehicle of claim 7, wherein the actual energy consumption data is collected for the vehicle and the actual energy consumption data represents at least one of a configuration of the vehicle, a maintenance condition of the vehicle, and a towing mode of the vehicle.

11. The vehicle of claim 7, wherein the computer-executable instructions are further configured to:
- identify at least one vehicle modification not included in a baseline vehicle during generation of the adjusted energy consumption model and that is used during collection of the actual energy consumption data;
- associate the at least one vehicle modification with the adjusted energy consumption model; and
- responsive to an indication that the at least one vehicle modification is in use, estimate the travel range using the adjusted energy consumption model associated with the at least one vehicle modification, wherein the at least one vehicle modification includes at least one element chosen from a trailer, a roof rack, a non-baseline wheel type, and a non-baseline tire type, and a non-baseline suspension component.

12. The vehicle of claim 7, wherein the computer-executable instructions are further configured to:
- communicate the actual energy consumption data over a network to a remote computing system; and
- generate a network-based adjusted energy consumption model that is accessible to a plurality of vehicles over the network.

13. A computer-implemented method comprising:
- collecting, by one or more processors coupled with memory, actual energy consumption data reflecting a usage rate of an amount of battery power for a vehicle to travel a unit distance;
- determining, by the one or more processors, a difference between the usage rate and a predicted usage rate of a predictive energy consumption model;
- generating, by the one or more processors, an adjusted energy consumption model for the vehicle by adjusting the predictive energy consumption model to account for the difference between the usage rate and the predicted usage rate;
- estimating, by the one or more processors, a travel range of the vehicle based on an available energy for the vehicle according to the adjusted energy consumption model; and
- displaying, by the one or more processors, the travel range of the vehicle using a navigation system of the vehicle.

14. The computer-implemented method of claim 13, further comprising:
- adjusting, by the one or more processors, separate models of the predictive energy consumption model that represent a driving type chosen from city driving, suburban driving, and highway driving according to a set of the actual energy consumption data collected from the driving type.

15. The computer-implemented method of claim 13, further comprising:
- collecting, by the one or more processors, the actual energy consumption data for at least one identified operator of the vehicle, wherein the adjusted energy consumption model is representative of driving of the at least one identified operator.

16. The computer-implemented method of claim 13, wherein the actual energy consumption data is collected for the vehicle and the actual energy consumption data represents a configuration of the vehicle, a maintenance condition of the vehicle, and a towing mode of the vehicle.

17. The computer-implemented method of claim 13, further comprising:
- identifying, by the one or more processors, at least one vehicle modification not included in a baseline vehicle used in generating the adjusted energy consumption model and that is used during collection of the actual energy consumption data;
- associating, by the one or more processors, the at least one vehicle modification with the adjusted energy consumption model; and
- responsive to an indication that the at least one vehicle modification is in use, estimating, by the one or more processors, the travel range using the adjusted energy consumption model associated with the at least one vehicle modification, wherein the at least one vehicle modification includes at least one element chosen from a trailer, a roof rack, a non-baseline wheel type, and a non-baseline tire type, and a non-baseline suspension component.

* * * * *